F. TIEMANN.
PROCESS AND APPARATUS FOR PURIFYING SOLUTIONS.
APPLICATION FILED JAN. 11, 1910.
997,477.
Patented July 11, 1911.
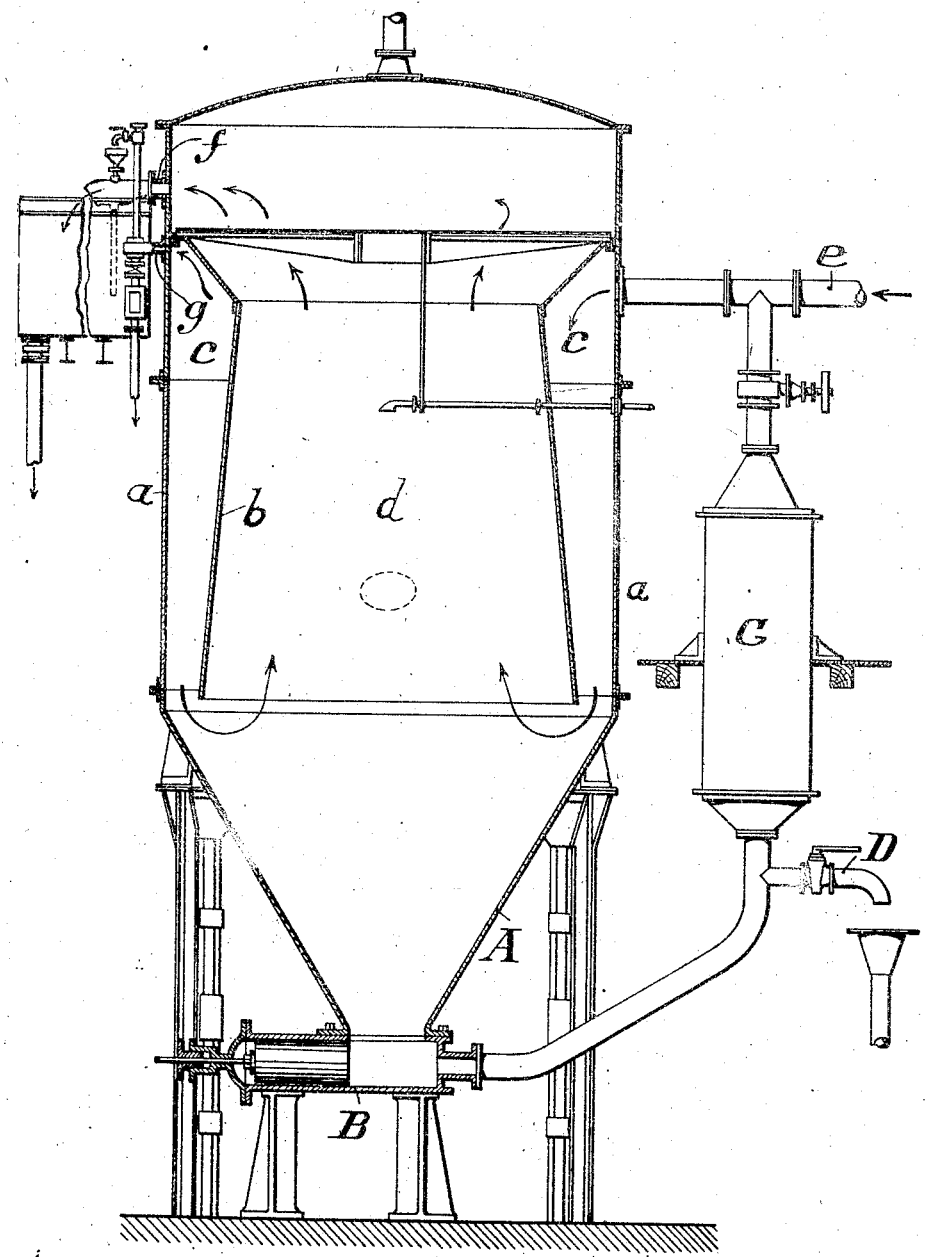

UNITED STATES PATENT OFFICE.

FRITZ TIEMANN, OF BERLIN, GERMANY.

PROCESS AND APPARATUS FOR PURIFYING SOLUTIONS.

997,477.  Specification of Letters Patent.  Patented July 11, 1911.

Application filed January 11, 1910. Serial No. 537,560.

*To all whom it may concern:*

Be it known that I, FRITZ TIEMANN, a subject of the German Emperor, and a resident of 259 Kurfürstendamm, Berlin, Germany, have invented certain new and useful Improvements in Processes and Apparatus for the Purification of Solutions; and I do hereby declare the following to be a full, clear, and exact description of the invention, such as will enable others skilled in the art to which it appertains to make and use the same.

For the continuous purification of solutions, such as sugar juice, from their impurities and precipitates, different kinds of apparatus are in use in which, as in the settling receptacles employed for the purification of water, the liquid is conducted downward and upward by means dividing the interior of the receptacle into different parts. In this process, the speed of flow of the liquid is so regulated that the impurities and residue can settle down on the bottom or rise upward to the top according to their specific gravity.

In order to thicken or condense the impurities which separate out on the bottom of the receptacle, it has been proposed to place in the lower part of the apparatus a rotary compressing or condensing device which presses or forces the impurities in a downward direction and out of the apparatus. In this way, the impurities or substances which collect on the bottom and are mixed with the liquid, can be removed periodically or continuously from the lower part of the apparatus, while the impurities which rise to the top of the liquid are also carried off in a suitable manner. It has been found that this arrangement does not give satisfactory results, for on the one hand the impurities are too small in quantity to effect an appreciable thickening or condensing, and on the other hand, they are so fine that even when the apparatus is operated periodically a sufficient thickening or condensation is impossible. As a result, a large quantity of the liquid or solution is removed from the apparatus with the slime or other impurities. Moreover, a marked cooling off of the sugar juice in the lower part of the apparatus takes place, and as the juice is highly heated in order to cause the separation of the impurities, this result should, of course, be avoided as far as possible.

The object of the present invention is to eliminate these drawbacks, and to this end the improved process according to this invention consists essentially in collecting the impurities which fall to the bottom of the purification receptacle, passing them through a heating device and then adding them to the fresh liquid to be purified prior to the introduction of the latter into the apparatus or at substantially the same time that such introduction takes place.

The novel features of the invention will appear clearly from the following description and claims.

In the accompanying drawing, I have illustrated diagrammatically an apparatus suitable for the carrying out of the aforesaid process.

The purification receptacle $a$ which is, as usual, of conical shape at its lower part, is provided with an insertion or inner wall $b$, that is firmly attached at its upper portion to the wall of the receptacle. The insertion $b$ is preferably wider toward the lower end than at the top in order to make the flow of the solution slower at the bottom and allow the lighter impurities to rise to the surface and remain there. The solution or liquid enters the apparatus through a pipe $c$ and passes into an annular space $c$, around the insertion, in which space it flows downward and then upward in the space or chamber $d$ formed by the insertion, passing out of the apparatus through the discharge pipe $f$. The impurities which settle down in the liquid collect on the bottom of the receptacle $a$. The inlet $e$ is placed somewhat below the top of the annular space $c$, which top is formed by the insertion $b$, in order that the impurities which rise upward in the solution collect above said inlet. These impurities are conducted off from the apparatus by means of a pipe $g$, the pressure of the body of liquid being sufficient to effect this end. It is preferable to regulate the quantity discharged by the adjustment of a valve or by the insertion of a movable outlet closing device (a piston or the like), the number of revolutions and the stroke of which are adjustable, so that practical y only the condensed impurities escape from the apparatus.

At the bottom conical portion A of the settling vessel is arranged a conveyer device, for instance a piston pump B, which discharges the slime masses into a "calorisator" or heating device G. The latter may consist of a heating apparatus provided with heating pipes, or steam can be introduced direct into the piping by means of an injector nozzle or the like. The heating of the slime is preferably carried on again to a high temperature. From the calorisator the slime passes into the inlet pipe e for the admission of fresh juice, becomes mixed with the latter and then passes again into the outer space or chamber c of the settling vessel. Owing to the renewed heating of the slime, the latter is caused to form large flakes, and a further coagulation again takes place. As a result of the continuous return of the separated substances which owing to the renewed heating have become heavier and formed large flakes, the percentage of these substances contained in a unit quantity of juice is increased, and the fine and light separations are caught by the large flakes and quickly carried down, so that a reliable and perfect purification of the juice is effected within the shortest possible time. Moreover, the impurities settled are considerably condensed in the bottom portion of the vessel, without being cooled too much, so that they contain only a small quantity of juice.

By means of the discharge pipe marked D in the drawing, a portion of the slime is removed from time to time, as soon as it is ascertained by testing that the condensation of the slime is sufficient.

The operation of the apparatus can be assisted, if desired, by employing a suitable condensing device in the lower part of the purification receptacle.

The device described has the following advantages:—

(a) The cooling of large quantities of juice which are being treated, and more particularly of the slime deposits is avoided.

(b) Insufficient condensation of the slime to be separated, is avoided.

(c) A more complete purification takes place as the large flakes formed from the separated particles by the renewed heating, catch the fine precipitates and carry them down, and at the same time.

(d) A quick and very reliable purification of the juice is effected.

What I claim is:—

1. A process for the continuous purification of liquids such as sugar juice, which consists in causing the separation and settling of the impurities in the liquid while the latter flows through a suitable purification apparatus, collecting the slime or impurities, heating the same, and then introducing the heated impurities into the fresh liquid supplied to the apparatus for purification.

2. A process for the continuous purification of liquids such as sugar juice, which consists in causing a separation and settling of the impurities while the liquid flows through a suitable purification apparatus, collecting the slime or impurities which fall to the bottom of the apparatus, heating such impurities, introducing them into the fresh liquid supplied to the apparatus, and carrying off a portion of the slime or impurities as soon as a sufficient thickening or condensation is reached.

3. A process for the continuous purification of liquids such as sugar juice, which consists in the separation and settling of the impurities while the liquid flows through a suitable purification apparatus, thickening or condensing the slimes or impurities within the apparatus, collecting the settling slimes, heating the same, adding the heated slime to the fresh liquid supplied to the apparatus for purification, and carrying off a portion of the slimes as soon as a sufficient thickening or condensation is obtained.

4. A process for the continuous purification of liquids such as sugar juice, which consists in the separation and settling of the impurities while the liquid flows through a suitable purification receptacle, collecting the impurities which settle at the bottom of such receptacle and removing them from the latter, and passing such impurities through a suitable heater and then into the fresh body of liquid entering the apparatus to be purified.

5. In apparatus for the purification of liquids such as sugar juice, the combination with a settling receptacle, of an exterior heating device, and means to pass through said heating device and into the stream of fresh incoming fluid the impurities which have settled to the bottom of said receptacle.

6. In apparatus for the purification of liquids such as sugar juice, the combination with a settling receptacle having a conical lower portion, of an exterior heating device connected with the inlet for the fresh liquid to be purified, and a pump which forces through said heating device and into the steam of fresh incoming liquid, the impurities which have settled to the bottom of said receptacle.

In testimony whereof I have affixed my signature, in presence of two witnesses.

FRITZ TIEMANN.

Witnesses:
HENRY HASPER,
WOLDEMAR HAUPT.